Oct. 9, 1973   J. N. CALVIN   3,764,470
FLOW TWISTER
Filed Jan. 4, 1971
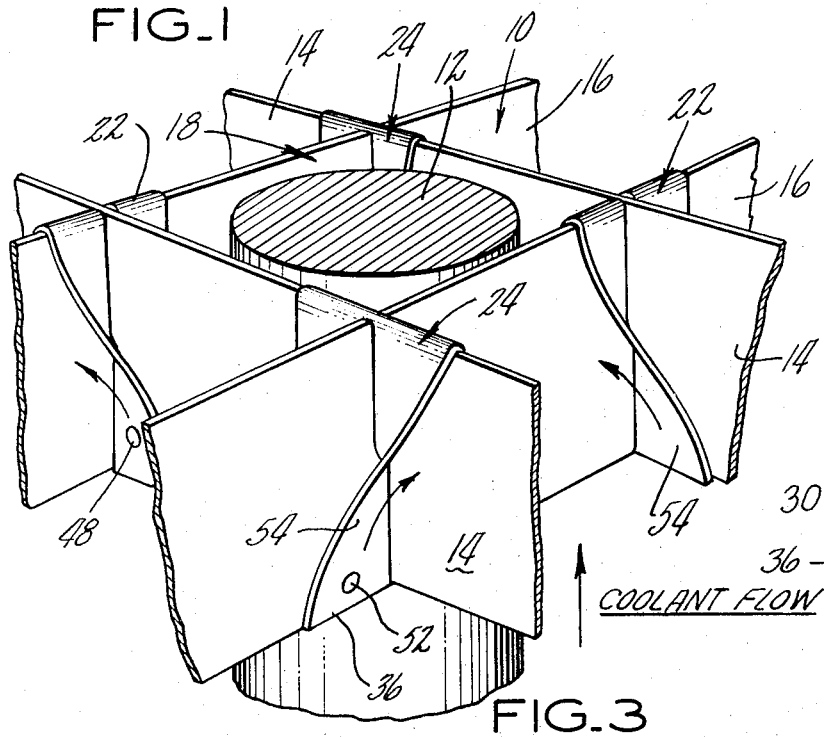
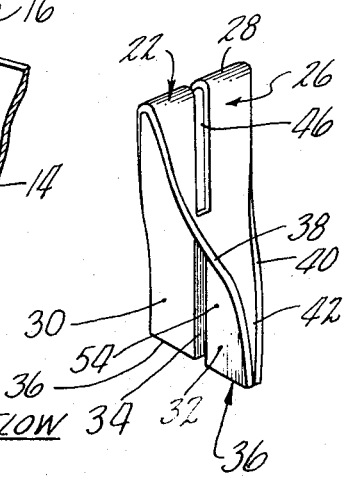
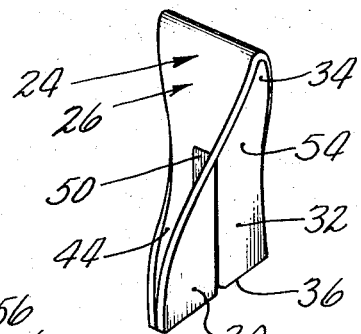
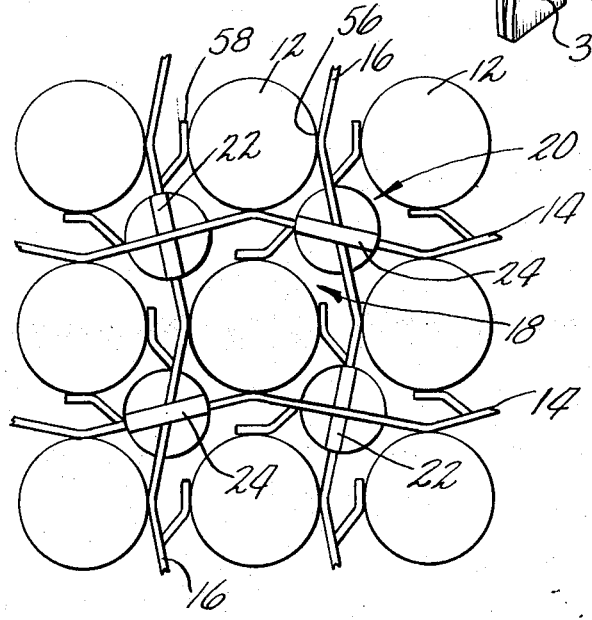
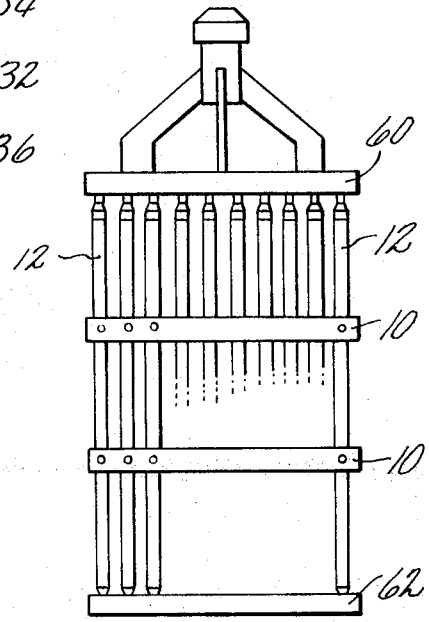
INVENTOR
JOHN N. CALVIN

United States Patent Office 3,764,470
Patented Oct. 9, 1973

3,764,470
FLOW TWISTER
John N. Calvin, West Simsbury, Conn., assignor to
Combustion Engineering, Inc., Windsor, Conn.
Filed Jan. 4, 1971, Ser. No. 103,452
Int. Cl. G21c 3/34
U.S. Cl. 176—76
10 Claims

ABSTRACT OF THE DISCLOSURE

A flow twister for the cooling fluid flowing longitudinally in channels between spaced parallel nuclear reactor fuel elements positioned laterally by intersecting grid members. The twister is a U-shaped metal sheet straddling one grid member at an intersection. The free ends of the U are folded on themselves and form two pairs of oppositely directed spirals and a pair of slots receiving the other grid member. The sheet is slotted in alignment with the pair of slots. The twisters direct cooling fluid inwardly toward and spirally around the adjacent fuel rod.

BACKGROUND OF THE INVENTION

The fuel or fissionable material for nuclear reactors is conventionally in the form of fuel elements or rods which are in turn grouped together in the reactors in bundles comprising fuel element assemblies. An elongated support means in the fuel assembly is provided to vertically support the fuel elements or rods. A plurality of longitudinally spaced grids extend across and are secured to elongated support means. The fuel rods, in turn, extend in a parallel array through openings in the grids nad are vertically supported by the bottom end portion of the support means. Each grid has means for laterally positioning the fuel rods. Each reactor has a number of such fuel element assemblies therein comprising the reactor core. The liquid moderator-coolant, normally water, flows upwardly through the reactor core in the channels or longitudinal passageways between the fuel elements to remove heat. Reference may be made to Pat. No. 3,379,619 for a more detailed showing of a typical assembly.

One of the operating limitations on current reactors is established by the onset of film boiling on the surfaces of the fuel elements. This phenomena is commonly described qualitatively as departure from nucleate boiling (DNB) and quantitatively in terms of the amount of heat flux existing when the DNB occurs (critical heat flux or CHF). This condition is affected by the fuel element spacing, the system pressure, the heat flux, the coolant enthalpy and the coolant velocity. When DNB occurs, there is a rapid rise in the temperature of the adjacent fuel element due to the reduced heat transfer which could result in a failure of the element. Therefore, in order t o maintain a factor of safety, the reactor must be operated a certain margin below the CHF and the point at which DNB occurs. This margin is referred to as the "thermal margin."

Nuclear reactors normally have regions in the core which have a higher neutron flux and power density than other regions. This may be caused by a number of factors, one of which is the presence of control rod channels in the core. When the control rods are withdrawn, the control rod channels are filled with moderator which increases the local moderating capacity and thereby increases the power generated in the adjacent fuel. In these regions of high power density, known as "hot channels," there is a higher rate of coolant enthalpy rise than in other channels. It is such hot channels that set the maximum operating condition for the reactor and limit the amount of power that can be generated since it is in these channels that the critical thermal margin would be reached first.

SUMMARY OF THE INVENTION

It has been found that coolant flow inclined to the fuel elements and fuel flow circulating around the fuel elements will result in a higher value for the critical heat flux probably because such flow inhibits the formation of steam bubbles and superheated water layers or voids which are found to exist over the fuel element surface just prior to DNB in the presence of parallel flow. It has also been found that mixing vanes or flow deflectors or flow twisters placed in the coolant flow channels of a reactor core will mix coolant from various channels and thus tend to reduce the effect of hot channels. The mixing lowers the high coolant enthalpy rise in the hot channels and tends to average out the enthalpy rise over the entire core cross section. Both effects mean that the reactor can be operated at a higher power level and still maintain a safe thermal margin.

It is therefore an object of the present invention to provide novel coolant flow deflectors and twisters in the reactor core.

Another object of the invention is flow deflectors which will effectively twist the coolant flow and cause disturbance of the coolant flow adjacent the surfaces of the fuel elements as well as cause mixing of the coolant among adjacent channels.

A further object is to provide a flow twisters of a simple novel design and which are supported in the core in a novel manner.

A still further object is a flow twister formed from flat sheet metal stampings clipped or spot welded to the spacer grid strips of a fuel assembly.

The objects of the invention are accomplished by providing a coolant flow twister in one or more of the spaces between adjacent fuel elements. The twister is generally of a spiral shape and supported so that flow will be diverted from the centers of the flow channels toward and circulated around adjacent fuel elements. The twisters are supported at the intersections of the strips of a grid which may also serve as a support grid for the fuel element. The twisters straddle one of the grid strips and may be fastened as by spot welding to the intersecting grid strip.

These and other objects and advantages of the present invention will become apparent when considered in view of the following detailed description and annexed drawings.

BRIEF DESCRIPTION OF THE DRAWINGS

FIG. 1 is an isometric view of a portion of a fuel assembly with a spacer grid fitted with flow twisters.

FIG. 2 is an isometric view of a twister with a slot at the top portion.

FIG. 3 is an isometric view of a twister with a slot at the bottom portion.

FIG. 4 is a plan view of a portion of a fuel assembly and spacer grid with the two types of flow twisters mounted in the grid at the intersections of the grid strips.

DESCRIPTION OF THE PREFERRED EMBODIMENT

A nuclear fuel assembly may comprise an upper end fitting 60 (FIG. 5) connected with a lower end fitting 62 by elongated supports or thimbles (not shown). Between the two fittings may be a plurality of spaced spacer grids 10 which may be secured to the supportsor thimbles to hold them in position. Fuel rods 12 may be inserted through the upper fitting and through openings or passageways in the grid and down onto the lower end fitting which supports them. The spaced fuel rods 12 define channels between the rods through which a cooling fluid, which may be water and may be pressurized, is forced. The core of a nuclear reactor is formed from a plurality of such fuel assemblies and it is in such assemblies that the coolant flow twisters of the present invention are incorporated. The reactor coolant flows up through apertures in the lower end fitting 62 and upwardly along the elongated fuel elements 12 and out through the upper and fitting 60. The grid strips 14 and 16 intersect in the coolant flow channels and the coolant flow unless disturbed will be generally parallel to the elongated fuel rod. It is this upward parallel coolant flow through the fuel assemblies which is disturbed and twisted by the twisters of this invention.

The coolant flow twisters are mounted on the spacer grids 10 preferably at the intersection of the strips 14 and 16. The spacer grids are located at intervals along the length of the fuel assembly. These grids may be for the sole purpose of suporting the deflectors as shown in FIG. 1 or they may be for the additional purpose of spacing and holding the fuel elements as shown in FIG. 4.

FIG. 1 illustrates a single fuel rod 12 located or passing through an opening or passageways 18 in the grid 10 formed of intersecting grid strips 14 and 16. These grid strips 14 and 16 intersect at approximately the center of a channel indicated at 20 generally and defined by the four surrounding fuel rods 12. The flow twisters 22 and 24 are mounted on the grid strips at the intersection of the strips. The twisters 22 and 24 are substantially identical with the exception that the twister 22 is slotted at the upper end and the twister 24 is slotted at the lower end to accommodate a grid strip which passes through the slot. The reason for having two different twisters will become apparent as the specification proceeds.

As shown in FIG. 1 the grid strips may be generally straight thin intersecting metal strips, of substantial width, which may be secured together in any suitable manner and are preferably intermeshed in the manner used in the egg separators in an egg crate in which all the strips running in one direction are slotted downwardly from the upper edge about half their width to receive the strips running in the other direction and the strips running in that other direction are slotted upwardly from the bottom about half their width to receive the strips running in the one direction. Such a structure will provide a grid of intersecting and interengaging grid strips. The grid strip 14 may thus be assembled with the grid strip 16 by pushing the slots in grid strip 14 downwardly through the slots in the grid strip 16.

The twister shown in FIG. 2 is formed of a sheet of material which may be a metal sheet and may be a metal stamping having first and second surface bounded by a first edge at one end and side edges extending from the first edge to the end edge at the other end. In forming the twister of FIG. 2 a sheet of material generally indicated at 26 is folded on itself, or two separate sheets or twisters are joined at one end edge to provide a common upper edge or end, so as to form a U-shaped member or sheet of material having an upper edge or end and two depending legs 30 and 32 and forming a slot 34 between the legs. The lower end 36 of each leg portion of the U-shaped member is folded on itself so as to bring the side edges 38 and 40 and portions of one surface into juxtaposed position and thus form the lower ends of the legs into a pair of U-shaped members extending outwardly from the slot 34 or the slot forming portions of the respective leg and from a plane defined by said upper end or edge and the longitudinal central portion of the sheet or leg intersecting therewith, thus forming second and third slots one of which 42 is shown in FIG. 2. A slot 46 is cut, either in the original stamping or after the twister has been folded in the shape shown in FIG. 2, extending from the upper edge 28 about half way down the twister and in alignment with slots 42 and 44 to receive the grid strip 14. As shown in FIG. 1 grid strip 14 passes through slots 46 and 42 and 44 and the twister straddles grid strip 16 with grid strip 16 passing through the slot 34. The lower outside ends of the folded depending legs 30 and 32 may be spot welded or otherwise fastened as at 48 to the grid strip 14 passing through the slots 42 and 44. It should be noted that this twister may be assembled with the grid strip 14 before the strips are assembled into the grid form as the grid strip 14 may be pushed down into interengaging relation with the grid strip 16 with the twister 22 assembled thereon.

The twister 24 shown in FIG. 3 is essentially the same as the twister 22 shown in FIG. 2 except that the slot 50 which is cut into sheet 26 is cut about half way up the folded sheet from the bottom edge whereas the slot 46 in the FIG. 2 structure is cut about half way down from the upper edge. As in the case of the twister 22 the slot 50 and twister 24 may be cut in the sheet either before or after the folding operations and the sequence of folding steps may be reversed. The slot 50 is cut to align with the slots 42 and 44 formed in the lower end of the depending legs 30 and 32. As shown in FIG. 1 twister 24 straddles grid strip 14 which passes through the slot 34 formed by the U-shaped twister. The grid strip 16 passes through the slots 42 and 44 of the U-shaped dependent legs and through the slot 50. The lower outside ends of the folded legs may be spot welded or otherwise fastened to the grid strip 16 as at 52. The slot in grid strip 16 straddles the upper portion of the twister 24. It should be noted that the twister 24 may be assembled onto the grid strip 14 before or after the grid strips have been assembled but that once the grid strip 14 is spot welded to the twister 24 none of the grid strips or the twisters may be removed. The grid strips and the twisters are thus held in assembled relation.

The folding or doubling of the lower ends of the dependent legs 30 and 32 to form U-shaped members will twist the sheet metal of the twisters and form what was the inner surface of the original U-shaped member into a spiral surface. The twister is thus formed into a member having a straight upper edge formed by the fold at the top of the U-shaped member and four spiral surfaces depending from that edge. The spiral surfaces are arranged in oppositely directed pairs of spirals so that each spiral member is twisted in a direction opposite to that of its adjacent spiral member. As shown in FIGS. 1 and 4 the twisters are placed at the intersections of the grid strips 14 and 16 and the twisters 22 and 24 are alternated along each strip so that the twisters 24 are at diagonally opposite corners of the opening through which the fuel rod 12 extends and the twisters 22 are at the other diagonally opposite corners. This will place adjacent twisters 22 and 24 at substantially right angles to each other. With this arrangement it will be noted that fluid flowing upwardly through the grid will be twisted or turned in the same direction by each twister in any given opening. Fluid flowing upward through the grid will first contact the lower edge 36 of the twister and then be forced in a circular direction around and also toward the fuel rod 12 in the opening by the spiral surface such as 54. By thus arranging the twisters each twister in an opening will assist all the others in producing the circular motion of the fluid around the fuel rod and, because of the decreasing area under the spiral surface 54 as it approaches the top of the grid, the grid and twister will tend to force the fluid toward the fuel rod and thus increase the turbulence and the mixing.

As shown by the arrows in FIG. 4 the circulation of the fluid around adjacent fuel rods is in opposite directions so that the circulation in each opening will assist the circulation in the four adjacent openings. In the channel formed by and between four adjacent fuel rods it will be noted that the flow will come in opposite directions from opposite sides of the channel and exit at substantially right angles from the two remaining opposite sides of the channel. The exit flow from the channel will, by the circular motion of the fluid around the fuel rods, be led to the next adjacent channel where it will again be discharged at right angles. Thus it will be apparent that the circular motion around the individual fuel rods not only increases the turbulence around the rods but will also induce flow from one channel to the next not only around each individual fuel rod but also diagonally across the assembly. Thus the twisters act effectively to equalize the temperature of the coolant flowing through the assembly across the entire section of the assembly.

FIG. 4 shows an assembly in which the grid strips are bent to provide a relatively rigid support for the fuel rod at 56 where the bend contacts the fuel rod and the strips are provided with spring fingers 58 to further assist in supporting the fuel rod. The fuel rod is thus supported in four places, two of them being by the relatively rigid supports 56 and the other two by the spring fingers 58 diagonally opposite the rigid supports 56. The oblique nature of the twisters 24 shown in FIG. 4 is obtained by folding or doubling the lower end of the depending legs of the twister at an acute angle instead of a right angle.

It will be understood that the twisters shown and described herein are merely illustrative and that changes may be made without departing from the scope of the invention as claimed.

What is claimed is:

1. A nuclear reactor fuel assembly comprising a plurality of parallel fuel elements defining longitudinally extending coolant flow channels therebetween, a flow twister comprising a sheet of material having a first and a second surface bounded by a first edge at one end and side edges extending from said first edge to the end edge at the other end, said first edge and the longitudinal central portion of said sheet defining a plane, said side edges, and portions of said first surface, at said other end of said sheet juxtaposed, with the end edge and said first surface at said other end U-shaped and extending transversely outwardly from said plane and defining an outwardly extending other end, said second surface of said sheet forming at least one spiral surface between said ends and means comprising a fuel element grid supporting said twister in a flow channel with an end facing downstream.

2. A nuclear reactor fuel assembly as claimed in claim 1 in which said supporting means is a grid formed of intersecting cross members with the flow twister supported at a grid intersection and said juxtaposed surface portions of the sheet at said other end form a slot therebetween receiving a grid member.

3. A nuclear reactor fuel assembly as claimed in claim 2 in which said twister comprises a U-shaped sheet defining a first slot between opposed surfaces for receiving one grid member, with the closed end of the U forming said first edge, the other end of said twister including two legs forming the open end of said U, each leg of said sheet at said other end U-shaped and forming second and third U-shaped portions extending transverse to said first slot and defining second and third slots receiving the other grid member.

4. A nuclear reactor fuel assembly as claimed in claim 3 including a fourth slot extending transversely of said sheet, aligned with said second and third U-shaped portions and positioned at an end of said twister receiving said other grid member.

5. A nuclear reactor fuel assembly as claimed in claim 2 in which two twisters are arranged back to back with common first edges and forming a first slot between said two twisters receiving one grid member, said U-shaped end edges at said other end of each respective twister extending outwardly from said first slot in opposite directions and forming second and third slots receiving the other grid member.

6. A grid, for a nuclear reactor assembly, comprising intersecting cross members, a flow twister positioned at an intersection of said members, said twister comprising two parallel sheets of material having face surfaces and forming a first slot between the two sheets and having one end edge common, the end edge and one surface at the other end of each sheet U-shaped and forming an end portion extending outwardly from the slot forming portions of the respective sheet with the side edges of the respective sheet and portions of said U-shaped one surface juxtaposed at said other end, said juxtaposed surface portions of said respective sheet at said other end forming a slot therebetween, to thus form second and third slots in said twister, a surface of each sheet forming at least one spiral flow directing surface between said ends, one of said cross members extending through said first slot and the other cross member extending through the other slots.

7. A grid for a nuclear reactor fuel assembly as claimed in claim 6 having a slot for receiving said other grid member through said twisters at said other end transverse to said first slot and in alignment with said second and third slots.

8. A grid for a nuclear reactor fuel assembly as claimed in claim 6 having a fourth slot transverse to said first mentioned slot at said one end for receiving the other grid member.

9. A grid for a nuclear reactor fuel assembly as claimed in claim 6 including means fastening said outwardly extending other end portion of said sheet to the other grid member.

10. A grid for a nuclear reactor fuel assembly as claimed in claim 7 in which said cross members are edgewise intermeshing strips and including means fastening said outwardly extending other end portion of said sheet to said other grid member to thus secure said grid members against separation.

References Cited

UNITED STATES PATENTS

| | | | |
|---|---|---|---|
| 3,395,077 | 7/1968 | Tong et al. | 176—78 |
| 3,393,128 | 7/1968 | Obertelli et al. | 176—78 |
| 3,379,619 | 4/1968 | Andrews et al. | 176—76 X |
| 3,439,737 | 4/1969 | Boorman et al. | 176—78 X |
| 3,070,537 | 12/1962 | Treshow | 176—78 |
| 3,344,855 | 10/1967 | Clark | 176—78 X |

CARL D. QUARFORTH, Primary Examiner

E. E. LEHMANN, Assistant Examiner

U.S. Cl. X.R.

176—78

PO-1050
(5/69)

UNITED STATES PATENT OFFICE
CERTIFICATE OF CORRECTION

Patent No. 3,764,470            Dated October 9, 1973

Inventor(s) John N. Calvin

It is certified that error appears in the above-identified patent and that said Letters Patent are hereby corrected as shown below:

Column 2, line 57, insert --FIG. 5 is an elevation view of a fuel assembly.--;
          line 65, insert a space between "supports" and "or".

Column 3, line 20, insert --18-- after "opening";
          line 20, change "passageways" to --passageway--;
          line 20, delete "18" after "passageway".

Signed and sealed this 1st day of October 1974.

(SEAL)
Attest:

McCOY M. GIBSON JR.           C. MARSHALL DANN
Attesting Officer           Commissioner of Patents